United States Patent Office 3,432,996
Patented Mar. 18, 1969

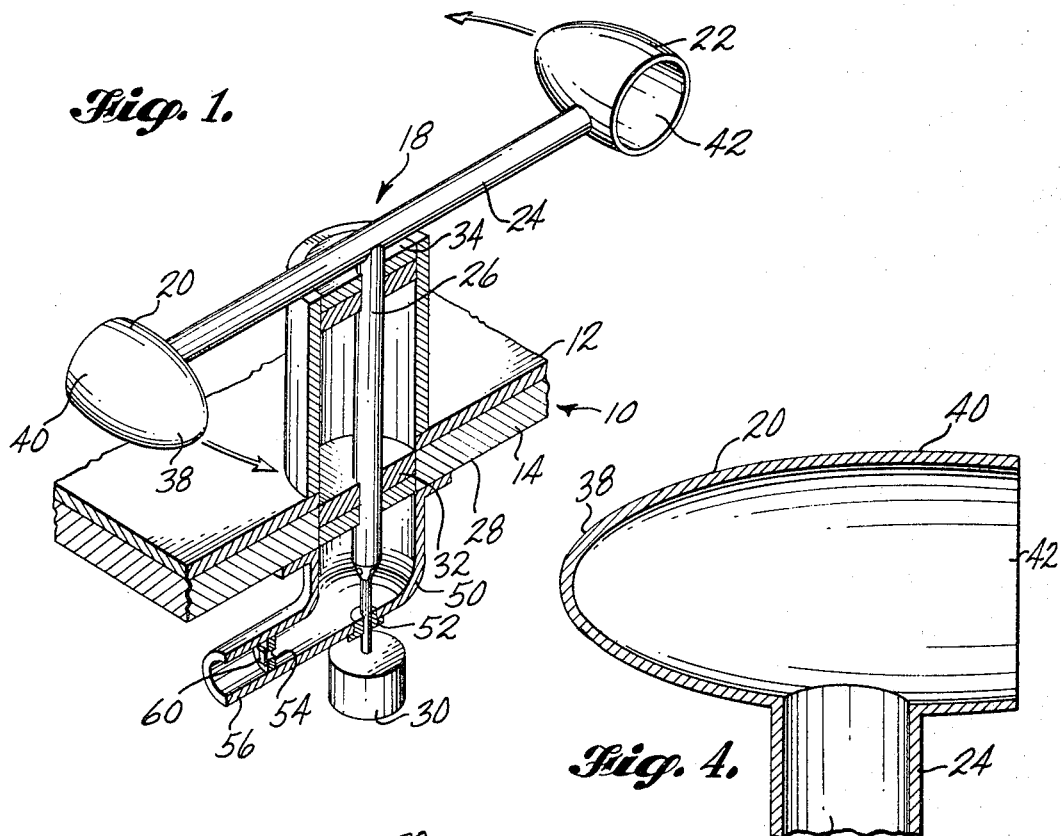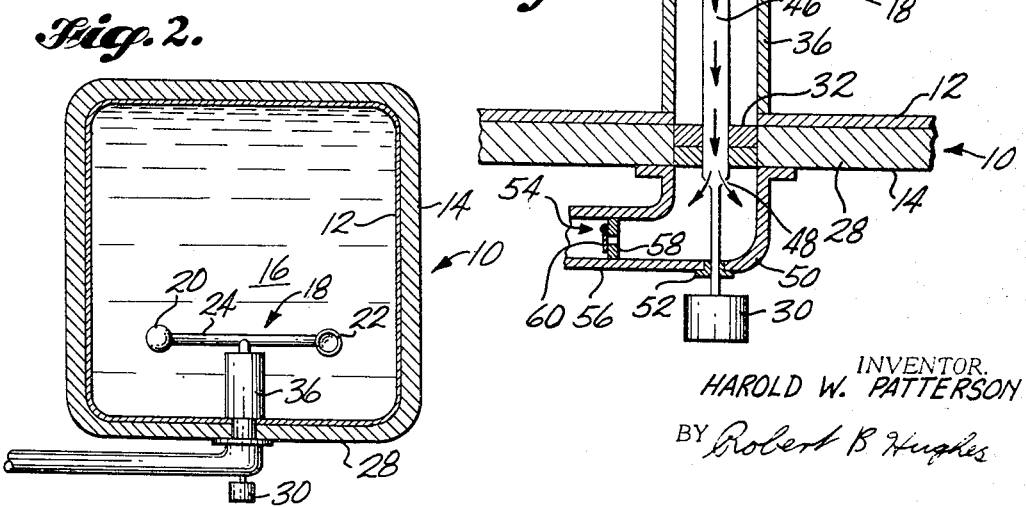

3,432,996
CAVITATING VAPOR EXTRACTOR
Harold W. Patterson, Bellevue, Wash., assignor to The Boeing Company, Seattle, Wash., a corporation of Delaware
Filed Apr. 29, 1966, Ser. No. 546,406
U.S. Cl. 55—189
Int. Cl. B01d 47/18
5 Claims

ABSTRACT OF THE DISCLOSURE

A cavitating member disposed in a tank of cryogenic fluid, said cavitating member comprising two cup-like members mounted for following a circular path through the fluid and having vent passages leading from the trailing edges of said cups to a location outside of the tank.

---

This invention relates to an improved apparatus for venting vapor that forms from a contained liquid, and more particularly to such an apparatus especially adapted for use in venting vapor from a cryogenic fluid under conditions of weightlessness or other conditions (e.g., upside down travel) which make difficult the separation of vapor from the liquid.

When a tank containing a cryogenic fluid is stored for any period of time, usually the fluid will absorb heat from its surrounding environment and thus experience an increase in pressure. Under normal gravity conditions, this pressure can be relieved simply by providing a pressure relief valve at the top of the tank, and venting the vapor that forms at the top of the tank to the surrounding atmosphere. However, if such a tank is carried in a spacecraft where it will be experience conditions of weightlessness, there is the problem that the vapors will not necessarily become located at the top of the tank, with the result that the cryogenic fluid itself will often be wastefully vented. The prior art proposes various solutions. For example, one is simply to accept the fact that fluid will part of the time be vented from the tank, and to provide heat exchange apparatus which permits the vented fluid to expand to vapor in a manner that it absorbs heat from the still contained fluid so as to reduce pressure in the tank. Another has been to provide a spinning chamber which separates the vapor from the fluid by centrifugal action, and to vent vapor from the center of the chamber. While these prior art systems are workable, in view of the rather severe design limitations imposed on space vehicles (e.g., as to weight, power requirements, reliability, etc.), it is recognized that their use in space vehicles or the like is not entirely satisfactory.

Thus, it is a principal object of the present invention to provide an improved apparatus for venting vapor from a fluid under conditions (e.g., weightlessness) which make separation of the vapor from the fluid difficult.

More specifically, it is an object to provide such an apparatus which is simple and reliable, and in various respects is particularly advantageous for use in spacecraft.

These and other objects and features of the invention will be more readily understood and appreciated from the following detailed description of the preferred embodiment thereof selected for purposes of illustration and shown in the accompanying drawing, in which:

FIGURE 1 is a perspective view of the venting apparatus of the present invention;

FIGURE 2 is a view taken in side elevation, showing said venting apparatus located in a cryogenic tank, the tank being shown in section;

FIGURE 3 is an enlarged side elevational view of the venting apparatus, showing parts thereof in section, and FIGURE 4 is a fragmentary sectional view taken on line 4—4 of FIGURE 3.

Reference is now made to FIGURE 2, wherein is shown a cryogenic tank 10, which is made up of a liner 12 and an outer insulating layer 14. Contained in this tank 10 is a cryogenic fluid 16 (e.g., liquefied oxygen), from which vapor is to be vented. For purposes of description, it will be assumed that this tank 10 is mounted in a traveling spacecraft which is in a condition of weightlessness (i.e., a zero G condition).

Mounted in one end (for purposes of description the "lower" end) of the tank 10 is a venting unit, generally designated 18. This unit 18 comprises a pair of hydrodynamically cavitating members 20 and 22, located within the tank 10 and mounted one on each end of a horizontally disposed cross-arm 24. The cross-arm 24 is in turn fixedly connected at its center portion to the upper end of a vertically disposed shaft 26 which extends downwardly through lower wall 28 of the tank 10 and connects to a small drive motor 30. The shaft is carried by a lower bearing 32 mounted in the lower tank wall 28 and an upper bearing 34 carried by a mounting sleeve 36 reaching into the tank 10.

In the particular embodiment shown herein, each of the cavitating members 20 and 22 has a generally hollow, cup-like configuration and has a rounded front end portion 38 and a generally cylindrical rear end portion 40 which defines a rearwardly facing vent intake opening 42. The two cavitating members 20 and 22 are horizontally disposed and face in opposite directions, in a manner that as the drive shaft 26 is rotated counterclockwise, the front end 38 of each member 20 and 22 travels forwardly through the cryogenic fluid 16. Each of the vent openings 42 in the members 20 and 22 communicates with a through passage 44 formed in, and extending the length of, the cross-arm 24, and this passage 44 leads in turn to a passageway portion 46 formed in the drive shaft 26. The passage 46 extends in the shaft 26 through the bottom wall 28 of the tank 10 and opens through holes 48 formed in the lower portion of the shaft 26 into an elbow fitting 50 secured to the tank wall 28 at the location of the shaft 26. The shaft 26 extends through a sealed fitting 52 in the elbow 50 to join to the motor 30. The elbow 50 in turn leads through a pressure relief valve 54 and thence to an outlet pipe, a portion of which is shown at 56. This relief valve 54 is only shown schematically as an orifice member 58 closed by a spring-loaded flap member 60.

In operation, the motor 30 is operated to turn the shaft 26 at a moderate speed (perhaps in the order of one or more revolutions per second) to cause the two cavitating members 20 and 22 to travel a circular path through the fluid 16, with the forward end portion 38 of each member 22 traveling forwardly through the fluid 16. This causes a reduction in pressure (i.e., cavitation) at the location of the rear opening 42 of each of the members 20 and 22. The amount of pressure reduction can, of course, be varied by varying the rotational speed of the unit 18. If the temperature conditions in the tank are such that vapor will form at the pressure level existing at the cavitation area, vapor will, of course, begin to form in these two areas of cavitation. On the other hand, whatever liquid there is in the passageway 44 will, due to the centrifugal action of the rotating cross-arm 24, tend to pass outwardly through the cross-arm passageway 44 and out the two openings 42 into the tank 10. Also, because of the centrifugal action of the unit 18, the pressure in the passageway 46 and in the fitting 50 will be slightly lower than that at the areas of cavitation so that liquid in the passage 46 and elbow 50 will vaporize. However, when the pressure in the tank 16 builds up to a sufficient level, the pressure relief valve 54 opens, permitting the vapor to pass through the openings 42 and through the passageways 44 and 46, through the fitting 50 and through the pressure relief valve 54 into the outlet pipe 56. This vapor may then be vented to an outside location and can, if desired, be put to some useful purpose within the spacecraft.

Now, therefore, I claim:

1. A vapor venting apparatus comprising in combination:
    (a) a tank defining a liquid containing chamber which has a mass of liquid at a predetermined pressure therein,
    (b) a hydrodynamically cavitating member disposed within said mass of liquid,
    (c) vapor extracting means including means to move said member through said mass of liquid in a manner to form a reduced pressure area proximate to said member and also comprising vent means having an intake portion located proximate to said reduced pressure area and an outlet portion communicating with said intake portion and located exteriorly of said chamber, said outlet portion leading to an exhaust area of a pressure lower than the pressure within said chamber and said intake portion of the vent means is formed in said cavitating member proximate to said reduced pressure area.

2. The apparatus as recited in claim 1 wherein said moving means comprises a support member carrying said cavitating member and mounted for movement along a predetermined path through said mass of liquid.

3. The apparatus as recited in claim 1 wherein said moving means comprises cavitating member carrying means including a rotatably mounted shaft to carry said cavitating member in a circular path in said container and said vent means is formed in said carrying means whereby vapor forming at said cavitating area can pass through said vent inlet portion and through said vent means.

4. The apparatus as recited in claim 1 wherein said moving means comprises a rotatably mounted shaft having carrying means extending radially from said shaft and connected to said cavitating member and said vent means extends along said carrying means and along said shaft.

5. The apparatus as recited in claim 4 wherein there is a plurality of cavitating members secured to said carrying means.

References Cited

UNITED STATES PATENTS

| | | | |
|---|---|---|---|
| 1,365,278 | 1/1921 | Ruth | 55—86 X |
| 3,017,951 | 1/1962 | Wiley | 55—200 X |

REUBEN FRIEDMAN, *Primary Examiner.*

R. W. BURKS, *Assistant Examiner.*

U.S. Cl. X.R.

62—50